US011760829B2

(12) United States Patent
Becker et al.

(10) Patent No.: US 11,760,829 B2
(45) Date of Patent: Sep. 19, 2023

(54) POLYURETHANE FOAM FORMULATION AND SOUND INSULATION WITH FOAMS BASED THEREON (MOTOR CAPSULE)

(71) Applicant: ADLER PELZER HOLDING GMBH, Hagen (DE)

(72) Inventors: Helmut Becker, Bochum (DE); Volkmar Schulze, Schierling (DE)

(73) Assignee: ADLER PELZER HOLDING GMBH

( * ) Notice: Subject to any disclaimer, the term of this patent is extended or adjusted under 35 U.S.C. 154(b) by 101 days.

(21) Appl. No.: 17/298,510

(22) PCT Filed: Nov. 11, 2019

(86) PCT No.: PCT/EP2019/080863
§ 371 (c)(1),
(2) Date: May 28, 2021

(87) PCT Pub. No.: WO2020/108972
PCT Pub. Date: Jun. 4, 2020

(65) Prior Publication Data
US 2022/0017681 A1    Jan. 20, 2022

(30) Foreign Application Priority Data

Nov. 28, 2018  (DE) .............. 10 2018 130 184.7

(51) Int. Cl.
| | |
|---|---|
| *C08G 18/10* | (2006.01) |
| *C08G 18/16* | (2006.01) |
| *C08G 18/32* | (2006.01) |
| *C08G 18/42* | (2006.01) |
| *C08G 18/54* | (2006.01) |
| *C08G 18/76* | (2006.01) |
| *C08G 18/48* | (2006.01) |
| *C08G 101/00* | (2006.01) |

(52) U.S. Cl.
CPC .......... *C08G 18/542* (2013.01); *C08G 18/10* (2013.01); *C08G 18/168* (2013.01); *C08G 18/3206* (2013.01); *C08G 18/4829* (2013.01); *C08G 2101/00* (2013.01); *C08G 2110/0008* (2021.01); *C08G 2110/0083* (2021.01); *C08G 2350/00* (2013.01)

(58) Field of Classification Search
None
See application file for complete search history.

(56) References Cited

U.S. PATENT DOCUMENTS

| | | | |
|---|---|---|---|
| 2,838,473 A | 6/1958 | Partansky et al. .............. 260/57 |
| 2,938,884 A | 5/1960 | Chern ............................ 260/58 |
| 3,470,118 A | 9/1969 | Forster .......................... 260/2.5 |
| 3,686,101 A | 8/1972 | David et al. .................... 260/2.5 |
| 4,046,721 A | 9/1977 | Austin et al. ..................... 260/2 |
| 4,789,690 A * | 12/1988 | Milovanovic-Lerik ............ C08L 63/00 521/902 |
| 8,906,975 B1 | 12/2014 | Dounis et al. ................ 421/128 |
| 2004/0029987 A1 | 2/2004 | Sawai ..................... C08G 18/10 |
| 2006/0052467 A1* | 3/2006 | Pignagnoli ................ C08J 9/08 521/131 |
| 2008/0015275 A1* | 1/2008 | Karami ................ C08G 18/542 521/170 |
| 2009/0264547 A1 | 10/2009 | Klesczewski et al. ....... 521/156 |
| 2011/0201705 A1* | 8/2011 | Okumura ........... C08G 18/5027 521/97 |
| 2012/0009407 A1 | 1/2012 | Peeler et al. .................. 428/220 |
| 2014/0315129 A1 | 10/2014 | Kidnie ....................... B41C 1/00 |
| 2015/0065592 A1* | 3/2015 | Girotti ................. C08G 18/092 521/128 |
| 2015/0099851 A1 | 4/2015 | Pinto et al. ........... C08F 216/10 |
| 2017/0260319 A1 | 9/2017 | Ishmael, Jr. et al. ........ C08G 18/6685 |
| 2017/0313806 A1 | 11/2017 | Yu .......................... C08G 18/18 |
| 2018/0051121 A1 | 2/2018 | Micheletti et al. .. C08G 18/482 |
| 2019/0119460 A1 | 4/2019 | Tomovic ............. C08G 18/4837 |
| 2021/0301069 A1 | 9/2021 | Meng ................... A47C 27/002 |
| 2022/0025099 A1* | 1/2022 | Schulze ................ C08G 18/12 |

FOREIGN PATENT DOCUMENTS

| | | | | |
|---|---|---|---|---|
| CN | 101959959 | 1/2011 | ............. | C08L 71/00 |
| CN | 105111997 | 12/2015 | ............ | C09J 175/14 |
| CN | 107531873 | 1/2018 | ............. | C08G 18/76 |
| DE | 40 01 044 | 7/1991 | ............. | C08L 71/02 |
| DE | 100 04 427 | 10/2001 | ............. | C08G 18/36 |
| WO | WO 00/73368 | 12/2000 | ................ | C08J 9/12 |
| WO | WO 2018/022368 | 2/2018 | ............. | C08J 11/24 |
| WO | WO 2018/165844 | 9/2018 | ................ | C09D 5/18 |
| WO | WO 2019/194966 | 10/2019 | ............. | C08G 18/50 |

OTHER PUBLICATIONS

First Office Action issued in Chinese Patent Appln. Serial No. 2019800905090, dated Sep. 20, 2022, with English translation, 12 pages.
First Office Action issued in Chinese Patent Appln. Serial No. 2019800905368, dated Aug. 16, 2022, with English translation, 14 pages.
U.S. Appl. No. 17/298,509, filed May 28, 2021, Schulze et al.
German Search Report issued in German Patent Appln. Serial No. 10 2018 130 184.7, dated Sep. 26, 2019, with machine English translation, 7 pages.
German Search Report issued in German Patent Appln. Serial No. 10 2018 130 176.6, dated Sep. 30, 2019, with machine English translation, 7 pages.
International Preliminary Report in Patentabiiity issued in PCT/EP2019/089863, dated May 25, 2021, 7 pages.
International Search Report and Written Opinion issued in PCT/EP2019/080863, with English translation, dated Feb. 4, 2020, 19 pages.

(Continued)

*Primary Examiner* — Melissa A Rioja
(74) *Attorney, Agent, or Firm* — HAYES SOLOWAY P.C.

(57) ABSTRACT

Disclosed is a polyurethane foam formulation based on conventional polyether and novolac polyols with, in particular, MDI for the production of soft-elastic PUR moulded foams with viscoelastic properties, in particular for sound insulation with foams based thereon.

12 Claims, No Drawings

(56) References Cited

OTHER PUBLICATIONS

International Preliminary Report in Patentabiiity issued in PCT/EP2019/080857, dated May 25, 2023, 7 pages.

International Search Report and Written Opinion issued in PCT/EP2019/080857, with English translation, dated Feb. 13, 2020, 17 pages.

"Cardolite—Chemistry for Tomorrow" Adhesive Product Overview, Oct. 2017, 14 pages.

Ullmann's Encyclopedia of Industrial Chemistry: "Polyurethanes" 2005, Wiley-VCH Vering GmbH & Co, KGaA, Weinheim doi: 10.1002/14356007.a21.665.pub2, 56 pages.

Office Action issued in related U.S. Appl. No. 17/298,509, dated Apr. 13, 2023, 14 pages.

* cited by examiner

POLYURETHANE FOAM FORMULATION AND SOUND INSULATION WITH FOAMS BASED THEREON (MOTOR CAPSULE)

The subject matter of the invention is a polyurethane foam formulation based on inherently conventional polyether and novolac polyols with, in particular, MDI for the production of soft-elastic PUR moulded foams with viscoelastic properties, in particular for sound insulation with foams based thereon.

Soft-elastic as well as viscoelastic polyurethane moulded foams are widely used in the field of vehicle acoustics. Commonly used soft-elastic foams are generally classified as the "high resilience" type and have a pronounced spring characteristic with spontaneous or fast recovery behaviour. In contrast to this, viscoelastic foam types are characterised by a delayed recovery behaviour after pressure deformation as an essential distinguishing feature from soft elastic foam types. In comparison to "high resilience" foams, viscoelastic foams generally achieve significantly better damping properties.

Viscoelastic formed PUR foams are usually based on MDI and a mixture of polyether polyols, mostly glycerol-based. While high molecular weight, low functionality polyols tend to be used for soft elastic foam types, low molecular weight, in particular in combination with high functionalities, results in preferred rigid foams. For specific application in viscoelastic formulations, the desired level of viscoelasticity is balanced by the amount of soft and hard segments within the polymer.

In contrast to soft-elastic or viscoelastic foams typically produced in a slabstock process, which are used in the mattress or upholstery industry, acoustically effective components in the field of vehicle acoustics are preferably produced directly as moulded parts with the desired component geometry. As a rule, two-component systems are used for this purpose, wherein one component of the reactive system being various (poly)-isocyanates, the second component consisting of a complex mixture of mostly different polyols, blowing agents, catalysts, stabilisers and possibly further additives.

The typical material properties of these foams are primarily determined by the polyol types used, their quantity distribution, the degree of cross-linking and the selected density. With regard to the intended use for acoustically effective spring-mass encapsulations of electric motors of motor vehicles, but also considering high temperatures in combination with humidity conditions, which often lead to premature ageing or even hydrolytic material decomposition, either polyester or polyether polyols are used. For current applications, mainly standard foams (HR foams) are used. Furthermore, these standard foams (based on conventional polyether base) are less sensitive to hydrolytic decomposition than polyester based types, but not far enough stable to withstand the above mentioned strictly modified ageing conditions. Basically, high temperatures lead to premature material ageing, while dry conditions lead to brittleness and hydrolytic conditions (as a result of high temperatures in combination with humidity) lead to softening effects, loss of mechanical and acoustic properties or even complete material decomposition.

The respective polyols differ essentially in terms of functionality, reactivity and molecular mass, whereby the functionality and basic structure is directly determined by the starter molecule used. As a chemical blowing agent, water is usually added to the polyol component, wherein the water reacts with the (poly)-isocyanate and carbon dioxide is released, which acts as the actual blowing agent.

Soft elastic foams are used in different designs for equally different acoustic applications. The applications range from pure absorbers to spring-mass structures. The insulating effect increases depending on the density or the combined mass layer. Compared to soft-elastic "high resilience" types, viscoelastic moulded foams are usually characterised by better damping properties and are therefore preferably used, in particular in the premium sector. This special viscoelastic material behaviour can be divided into pneumatic effects and structural properties, but mostly represents a combination of both. The so-called pneumatic ("asthma") effect is based on very small pore size, often also in combination with not completely open cell structure, which slows down the air exchange during compression as well as during recovery. The structural properties result from the combination of soft and hard segments within the polymer matrix and can be controlled accordingly via the quantity distribution of different functional polyols as well as the primary parameters mentioned.

US 2012/0009407 A1 discloses a rigid polyurethane foam including the reaction product of an isocyanate composition and a resin composition containing a novolac polyol having an average hydroxyl functionality of from 2 to 30, calculated by dividing the weight by molecular weight of the novolac polyol by the equivalent weight of the novolac polyol. The novolac polyol is present in an amount of 3 to 65 parts by weight per 100 parts by weight of the resin composition.

US 2015/0099851 A1 describes resins of cashew nut shell liquid and vinyl hydrocarbons that can be used as precursors for the production of epoxy resins and polyols for coatings, adhesives and composite formulations that exhibit improved performance in water repellency, corrosion protection performance and rapid hardness development during curing.

US 2017/0260319 A1 describes a hybrid polyurethane/polyurea polymer suitable for forming a coating on a structure in contact with water comprising the reaction product of a polyol component consisting of one or more polyols, a polyamine and a curing agent such as a polyisocyanate. The polyol component comprises a novolac-type polyether polyol.

Furthermore, numerous different combinations of polyether polyols are known to produce soft elastic or viscoelastic moulded foams. The transition from soft elastic to viscoelastic is smooth. This means that apparently clearly bouncy-elastic foams can already have measurable viscoelastic material properties. The loss factor, measured according to the vibrometer method, has established itself as a measurable variable. As a rule of thumb, the higher the loss factor, the more likely it is that the typical viscoelastic material behaviour is also haptically recognisable. For sound insulation applications, a higher loss factor usually also means better damping properties.

In addition to the loss factor, the corresponding modulus of elasticity plays a decisive role. Thus, despite a high loss factor, comparably harder foams can have worse acoustic insulation properties than those with a low loss factor but significantly lower hardness. The known material compositions of a wide variety of polyether polyols, often marketed specifically for use in viscoelastic foams, show an expected dependence on modulus of elasticity, loss factor and MDI index. In order to obtain a sufficient number of hard segments in the case of viscoelastic foams, a correspondingly high degree of cross-linking, i.e. a high MDI index, is necessary. At the same time, however, this tends to lead to higher strength or increased modulus of elasticity.

The efficiency of foamed, acoustically effective automotive trim parts is determined by the respective component concept as a whole, in particular by the special properties of the foam systems used. The acoustic efficiency is basically divided into two categories: absorption and insulation. The degree of absorption of a moulded foam component is primarily dependent on the porosity and size of the surface open to the sound and the inner cell morphology (cell size and distribution, number and ratio of open and closed cells), which in turn significantly influence the performance-determining properties of flow resistance and tortuosity.

In comparison, the insulation properties of moulded foams are determined by their density and elastic spring properties. In addition to the hardness or, in this case, the softness of the foam, the elasticity behaviour plays a decisive role. Both elastic and viscoelastic foam types are known, wherein viscoelastic versions in particular achieve a significantly better insulation effect in soft settings due to the higher insulation—expressed as a loss factor—than elastic foams in comparable settings with regard to hardness and moulded density. In order to increase the (sheet) damping properties of such foams, corresponding mass layers are usually used analogous to highly elastic foams and combined and back-foamed into so-called spring-mass elements. The acoustic effectiveness of the overall structure is then still determined by the above-mentioned properties of the spring (moulded foam), but additionally by the properties of the mass layer (weight per unit area, flexural softness). In this combination, a higher weight per unit area with the same backfoaming generally leads to improved damping of vibrating elements, which in the automotive sector are mostly sheet metal.

In the past, little attention was paid to hydrolysis resistance in known encapsulations of electric motors of motor vehicles. During the development of new moulded foams, the ageing weaknesses of the known moulded foams were discovered. The known viscoelastic moulded foams show a typical weakness in terms of compression set. Furthermore, the compression set is often used as an indicator for material ageing, in particular caused by hydrolytic processes. Moreover, hydrolytic conditions lead to general degenerations represented by significantly reduced mechanical properties such as tensile strength, elongation at break and compressive stress.

Therefore, the object of the present invention is to increase the hydrolysis resistance of a polyurethane foam formulation.

In a first embodiment of the invention, the aforementioned problem is solved by a polyurethane foam formulation for the production of viscoelastic PUR moulded foams, comprising:
a) a novolac polyol having a hydroxyl functionality of 3, a hydroxyl value in the range from 160 to 240 mgKOH/g
b) a polyether polyol having a hydroxyl functionality of 3, a hydroxyl value in the range from 20 to 40 mgKOH/g
c) a block/copolymer having a hydroxyl value in the range from 25 to 45 mgKOH/g and
e) a combination of catalytically active as well as stabilizing additives.

The polyurethane foam formulation according to the invention is based on a special material composition that meets the basic viscoelastic acoustic requirements and enables a moulded foam that also meets the new defined standards with regard to hydrolytic ageing. The polyether base polyol enables—similar to conventional foam compositions—a fundamentally soft and flexible foam product. The required combination of viscoelastic properties and significantly improved temperature and hydrolysis resistance is achieved by using a highly aromatic polyol of the Novolac type, whose molecular structure provides suitable building blocks for hard segments, but also strongly supports thermal and hydrolytic stability. The incorporation of the novolac polyols is essential to the invention, since their actual field of application is rigid polyurethanes.

The formulation according to the invention enables the production of moulded foam according to the above mentioned, fundamentally modified technical requirements, which meet the mechanical requirements as well as after advanced moisture ageing as well as acoustic aspects.

The polyols used differ in the used starter molecule, the resulting functionality, the molecular mass and the reactivity. Furthermore, specific modifications of the material behaviour via the isocyanate component are possible, e.g. by using pre-polymers.

In order to be able to specify the above-mentioned polyols, the aforementioned various parameters have crystallised in the state of the art:
i.) the hydroxyl functionality, which depends on the starter molecule on which the polyether polyol is synthesised;
ii.) the hydroxyl or OH number, which is a measure of the hydroxyl group content, and is given in mg KOH/g. It is determined according to DIN 53240;
iii.) the molecular mass (Mw), which is a measure of the length of the polyoxyalkylene chains of the polyether polyols.

The above-mentioned quantities can be related to each other via the following equation:

$$56100 = \text{OH number} \cdot (\text{Mw/hydroxyl functionality}).$$

The polyol component (a) consists of one or more polyols, one finally of a first polyether polyol, namely a (Novolac)—phenol-based polyether polyol having a phenol-based backbone. In this respect, particular reference is made to US 2017/0260319 A1 mentioned in the introduction to the description with regard to the definition of the novolac polyether polyol.

The polyether polyol component (a) may have the general composition of formula I:

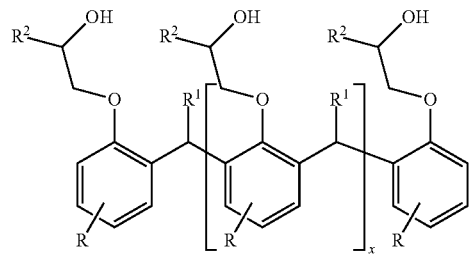

wherein each R is independently selected from H and hydrocarbyl groups such as C8-C20 fatty acids,
each $R^1$ is independently selected from H and hydrocarbyl groups,
each $R^2$ is independently selected from ether groups, and polyalkylene oxide groups, in particular having from 2 to 15 ether units, and
x is at least 1, in particular up to 100.

The first polyether polyol component (a) may be derived from at least one phenolic lipid selected from alkylbenzoic acids and alkylresorcinols.

The alkyl group of the alkyl benzoic acid and/or alkyl resorcinol may be at least one C8 alkyl group or at least one C10 or at least one C12 or up to C30 or up to C20 alkyl group.

In a preferred embodiment, R is a C8 or higher, such as up to C30, for example C10-C20 unsaturated fatty acid, such as an unbranched fatty acid having zero, one, two or more double bonds.

Examples of unsaturated fatty acids include myristic acid, palmitoleic acid, sapienoic acid, oleic acid, elaidic acid, vaccinic acid, linoleic acid, linolenic acid, a-linolenic acid, arachidonic acid, eicosapentaenoic acid, erucic acid and docosahexaenoic acid.

Examples of saturated fatty acids include capric acid, undecylic acid, lauric acid, tridecylic acid, myristic acid, pentadecylic acid, palmitic acid, margaric acid, stearic acid-nonadecylic acid, arachidic acid, henicosyl acid, behenic acid.

Novolac-type polyether polyols may be, for example, the alkoxylation products of a phenolaldehyde resin obtained by elimination reaction of phenol with an aldehyde such as formaldehyde in the presence of a Typically, a small amount of the acid catalyst or catalysts is added to a miscible phenol followed by an aldehyde such as formaldehyde.

The formaldehyde reacts between two phenols to form a methylene bridge, wherein electrophilic aromatic substitution between the ortho and para positions of the phenol and the protonated With increasing concentration of dimers, trimers, tetramers and higher oligomers can also form.

By controlling the quantity of material ratio of formaldehyde to phenol to slightly less than 1, the degree of polymerisation can be controlled.

The novolac resin can then be alkoxylated to bring the molecular weight to a desired level.

Phenols that can be used to produce the novolac resin include: o-, m- or p-cresols, ethylphenol, nonylphenol, p-phenylphenol, 2,2-to (4-hydroxyphenol) propane, beta-naphthol, beta-hydroxyanthracene p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl) phenol, 2-(4-hydroxyphen) ethanol, 2-carbethoxy-phenol and 4-chloromethylphenol.

The phenols used to produce the novolac-type polyether polyols may be substituted or unsubstituted.

Suitable novolac-type polyether polyols can be obtained, for example, by reacting a condensate adduct of phenol and formaldehyde with one or more alkylene oxides, including ethylene oxide, propylene oxide.

Processes for preparing such polyether polyols are described, for example, in U.S. Pat. Nos. 2,838,473, 2,938, 884, 3,470,118, 3,686,101 and 4,046,721. Novolac-type polyols can also be derived from the reaction of aldehydes with phenolic lipids, such as alkylbenzoic acids (salicylic acid substituted with an unsubstituted or substituted alkyl chain having, for example, 10 to 20 carbon atoms, such as an acardic acid) and alkylresorcines having an unsubstituted or substituted alkyl chain having, for example, 10 to 20 carbon atoms, such as cardol, and mixtures thereof.

The exemplary novolac polyol may include a polyether polyol derived from Cashew Nut Shell Liquid (CNSL), a non-nutritionally renewable material comprising mainly anacardic acid (2-hydroxy-6-pentadecylbenzoic acid) and a lesser amount of cardol (5-pentadecylre-sorcinol) and its methyl derivatives, such as 2-methyl-5-pentadecylresorcinol and 4-methyl-5-pentadecylresorcinol.

The CNSL-based formula contains the novolac structure in the backbone as shown in formula II:

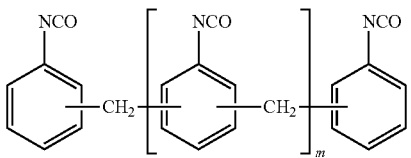

wherein m is at least 1 or at least 2.

The illustrated structure contains aromatic rings that greatly enhance the heat resistance, chemical resistance and continuity of the molecule.

In addition, the exemplary polyol contains a C8-C20 fatty acid side chain as an R group, e.g. each R is independently a C15-C17 chain derived from, for example, an acaric acid or cardol, which increases flexibility and hydrophobicity, while decreasing surface tension leading to marked adhesive properties.

Furthermore, the functionality is about 4.3, which leads to a much higher cross-link density.

The structure does not contain "ester" functionality to allow hydrolysis in basic solutions.

While other bio-based polyols with similar molecular masses can be used, they do not contain this structure and do not provide the same level of chemical resistance.

The polyol according to formula I or II may preferably have a hydroxyl value of at least 160 or up to 240.

The hydroxyl value is defined as the number of milligrams of potassium hydroxide required to neutralise the acetic acid taken up by one gram of polyol during acetylation.

Suitable novolac-type polyols according to Formula II based on renewable cashew nut shell liquid (CNSL) include Cardolite® NX 9001, available from Cardolite.

In one embodiment, the novolac-type polyol (and/or another polyether polyol) may be used to produce a polyurethane (e.g. using a ratio of novolac-type polyol to polyisocyanate of about 1:3 by volume).

Further included in the polyurethane foam formulation according to the invention for the production of viscoelastic PUR moulded foams is a second polyether polyol (b) which is different from the novolac-type polyol.

The second polyether polyol may be derived from cashew nut shell liquid. The second polyether polyol may comprise a high molecular weight polyol having a molecular weight of from 2000 to 10,000 or at least 3000 or at least 4000 or up to 7000 or up to 6000.

The second polyether polyol may be selected from a glycerol and propylene oxide based polyether triol, a polyether triol and mixtures thereof. In particular, the second polyether polyol may comprise at least one of a propylene glycol-based diol, a glycerol-initiated propylene oxide-based triol with an ethylene oxide cap, an amine-based polyol, a glycerol and sucrose-based polyol, and a Mannich-based polyol.

The polyol component may further include a low molecular weight polyether polyol having a MW of less than 2000 or less than 1000 or less than 500.

The polyether polyols b) and c) used according to the invention are preferably prepared by polymerisation of epoxides such as ethylene oxide, propylene oxide, butylene oxide, tetrahydrofuran, styrene oxide or epichlorohydrin with themselves or by addition of these epoxides, optionally in a mixture or one after the other, to starting components with reactive hydrogen atoms such as water, alcohols, ammonia or amines.

Particularly preferred among the epoxides mentioned above are ethylene oxide and propylene oxide. Very preferably, the polyether polyols used are composed only of propylene oxide as the epoxide component.

If several epoxides are used for the synthesis of the polyether polyols, the latter can have any desired arrangement of the oxyalkylene units, i.e. they can be homopolymers (if only one epoxide is used), copolymers c), "randorrT" copolymers, "capped" polymers or polymers which are "tipped" with a mixture of different epoxides in order to achieve a desired content of primary hydroxyl groups.

Renewable raw materials within the meaning of the present invention are understood to be compounds occurring in nature and which can also be isolated in this form.

For the purposes of the present invention, not derived from a renewable raw material means that the carbon skeleton of the renewable raw material in question is no longer contained within the polyether polyol of component (b) or (c). In particular, this means that said polyether polyol is not obtained by, for example, reacting a renewable raw material with epoxides to form a polyether polyol.

Examples of possible renewable raw materials are castor oil, polyhydroxy fatty acid, ricinoleic acid, oils modified with hydroxyl groups such as grape seed oil, black cumin oil, pumpkin seed oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, evening primrose oil, wild rose oil, safflower oil, walnut oil, fatty acids modified with hydroxyl groups and fatty acid esters based on myristic acid, palmitoleic acid, oleic acid, vaccenic acid, pertoselic acid, gadoleic acid, erucic acid, nervonic acid, linoleic acid and linolenic acid, stearidonic acid, arachidonic acid, timnodonic acid, clupanodonic acid, cervonic acid.

The above-mentioned renewable raw materials also include chemically modified compounds in which, however, the connectivity of the carbon skeleton itself remains unchanged (e.g. renewable raw materials modified with hydroxyl groups, created e.g. by hydroxylation of compounds or hydrogenated products).

Possible starter compounds are, for example, dicarboxylic acids such as succinic acid, adipic acid, phthalic acid and terephthalic acid.

Further possible starter compounds that may be used include, for example, ammonia or aliphatic and/or aromatic amines, which may optionally be substituted, such as for example N-monoalkyl-, N,N-dialkyl- and/or N,N'-dialkyl-substituted diamines. They have at least one primary or secondary amino group, such as for example 1,2-diamino-ethane, oligomers of 1,2-diaminoethane (for example diethylene-triamine, triethylenetetramine or pentaethylenehexamine), 1,3-diaminopropane, 1.3-diaminobutane, 1,4-diaminobutane, 1,2-diaminohexane, 1,3-diaminohexane, 1.4-diaminohexane, 1,5-diaminohexane, 1.6-diaminobenzene, 2.3-diaminotoluene, 2.4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines obtained by acid-catalysed condensation of aniline with formaldehyde. Further suitable starter molecules include alkanolamines, such as for example ethanolamine, N-methyl- and N-ethylethanolamine, dialkanolamines, such as for example diethanolamine, N-methyl- and N-ethyldiethanolamine and trialkanolamines, such as for example triethanolamine.

Further suitable starter compounds are those with two or more hydroxyl groups, such as for example water, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1,2-hexanediol, 1,3-hexanediol, 1,4-hexanediol, 1,5-hexanediol, 1,6-hexanediol, glycerol, trimethyl-olpropane, pentaerythritol, sorbitol and sucrose, castor oil, modified soybean oil. The starter compounds may be used alone or as mixtures.

Particularly preferably in the sense of the present invention, the proportion of component (a) is 5 to 35% by weight, based on the polyol component. Similarly, the proportion of component (b) is preferably 30 to 65% by weight, based on the polyol component, and independently thereof the proportion of component (c) is 5 to 15% by weight, based on the polyol component.

Preferably, the proportions by weight of components (a) to (c) (if appropriate independently of one another) are in the following amounts: (a) 10 to 20 wt. %, (b) 40 to 55 wt. % and (c) 8 to 13 wt. %. The percentages by weight refer to the total mass of the polyol composition. These proportions by weight are preferred in that they result in a particularly high resistance to ageing and hydrolysis in the polyurethane foam according to the invention.

Particularly preferably in the sense of the invention, the formulation comprises catalytically active additives having at least one reactive (hydrogen azide) group.

In the preferred formulation, the quantity of material ratio of the polyol components to (poly)isocyanate may be 1:100 to 100:1 or 1:10 to 10:1 or 1:5 to 5:1 or be 3:1 to 1:3.

A monofunctional alcohol, amine or isocyanate molecule may be used in combination with the diisocyanate to control the final molecular weight.

The formulation may optionally contain additional additives as is known in the art.

Examples include thickeners, organic and inorganic fillers, emulsifiers, surface active stabilisers, pigments, dyes, UV light stabilisers, flow modifiers, antioxidants, fibres or other reinforcing materials, antistatics, plasticisers, diluents, moisture scavengers, anti-foaming agents, mould release agents, deaeration additives, thixotropics, flow additives, flame retardants, dispersants, biocides, fungicides, corrosion inhibitors, wetting and dispersing agents, colourants or other visual enhancement additives and the like.

These additives may be present, for example, in an amount of from 0.1% to 40% by weight of the formulation.

Examples of adhesion promoters include epoxy functional silanes, such as those available under the trademark SILQUEST® from Momentive Performance Materials Inc. such as for example Silquest® A-187 (gamma-glycidoxypropyltrimethoxysilane) and Silquest® A-186 (beta-(3,4)-epoxycyclohexyl) ethyltrimethoxysilane).

Examples of corrosion inhibitors include those that are free of heavy metals, such as calcium phosphate-based inhibitors available under the trade name HALOX® 430 JM, available from ICL Performance.

Examples of moisture scavengers include those containing a zeolite, such as VORATRON® EG 711, a 50% paste of L-powder in castor oil, available from Dow Chemical Company, and Baylith L-paste of UV-Light stabilisers and antioxidants can be incorporated into the coating formulation to inhibit oxidation and light degradation. UV light stabilisers may be used, for example, in an amount of from 0.05 to about 5% by weight, based on the formulation.

Light stabilisers may be used, for example, in an amount of from 0.05 to 5% by weight, based on the formulation.

Examples of light stabilisers include those sold under the trade names TINUVIN® and CHIMASSORB®, available from Ciba (BASF Corporation, Florham Park, N.J.). Examples of antioxidants include those sold under the trade names IRGANOX® and BHT, available from Ciba (BASF Corporation).

Wetting and dispersing additives for dispersing pigments, such as inorganic pigments, organic pigments and titanium dioxide, include solutions of a salt of unsaturated polyamine amides and low molecular weight acid polymers, such as ANTI-TERRA®-U 80, a solution of a low molecular weight unsaturated polycarboxylic acid polymer and a polysiloxane copolymer such as BYK®-P 104 and polyether-modified polydimethylsiloxanes such as BYK® 307 from Byk Adhesives & Instruments.

Examples of inert diluents that can be used include aliphatic linear, branched or cyclic ethers with 4 to 20 carbon atoms and mixed aliphatic-aromatic ethers with 7 to 20 carbon atoms, such as dibenzyl ether, tetrahydrofuran, 1,2-dimethoxyethane or methoxybenzene; aliphatic linear, branched or cyclic or mixed aliphatic-aromatic ketones containing 4 to 20 carbon atoms, such as butanone, cyclohexanone, methyl isobutyl ketone or acetophenone; aliphatic linear, branched or cyclic or mixed aromatic-aliphatic alcohols containing 4 to 20 carbon atoms, such as methanol, ethanol, butanol, 2-propanol, isobutanol, isopropanol, benzyl alcohol, methoxypropanol or furfuryl alcohol; aliphatic linear, branched or cyclic or mixed aromatic-aliphatic esters such as methoxypropyl acetate; aliphatic linear, branched or cyclic or mixed aromatic-aliphatic hydrocarbons such as toluene, xylene, heptane and mixtures of aliphatic and aromatic hydrocarbons having a boiling range above 100° C. under normal pressure and low-viscosity coumarone-indene resins or xylene-formaldehyde resins.

Aliphatic alcohols with a phenyl radical, such as benzyl alcohol, 1-phenoxypropane-2,3-diol, 3-phenyl-1-propanol, 2-phenoxy-1-ethanol, 1-phenoxy-2-propanol, 2-phenoxy-1-propanol, 2-phenylethanol, 1-phenyl-1-ethanol or 2-phenyl-1-propanol may be used.

The diluents may be used singly or as a mixture, e.g. from 0.1 to 20 wt. % or up to 10 wt. % or up to 5 wt. % o-der up to 1 wt. % or formulation.

Examples of deaerators (and defoamers) include organo-modified polysiloxane containing silica dust, such as TEGO® AIREX 900, available from Evonik Industries.

Suitable filler materials include those in fibrous, particulate or other forms made from inorganic materials, ceramics, composites, metallic filler, organic polymer, glass, thermoplastics, silica beads and the like.

Examples of fillers include silica fillers such as IMSIL® A-8, a fibrous material available from Unimin Corp. that is made from an inert, naturally occurring alpha quartz with a unique grape-like morphology, and mica fillers such as CD-3200 available from Mica Georgia Industrial Minerals.

The filler material may be surface treated so that it can react with at least one other compound in the mixture.

A further preferred embodiment of the invention consists of a process for producing soft elastic moulded foams having viscoelastic properties, which is characterised in that
A) a (poly)-isocyanate component,
B) a polyol formulation as defined above,
C) water, and
D) one or more catalysts and
E) optionally reacting further auxiliaries, fillers, stabilisers and/or blowing agents.

The above polymer reaction may be carried out at a temperature of at least 100° C., in particular by using MDI or a prepolymer based on MDI having an NCO content of 22 to 33%, preferably in a range of 26 to 30%.

The method may comprise mixing the first and second components at a temperature sufficient for the reaction to occur, wherein the first component includes the polyisocyanate and the second component includes the polyol and the polyamine.

In particular, it is preferred that the MDI index is in a range from 50 to 100, in particular 65 to 85.

The polyisocyanate may include a polymeric methylene diphenyl diisocyanate.

The polyisocyanate may be in a first component and the polyol and polyamine may be a second component.

The formulation may further comprise at least one additive selected from thickeners, organic and inorganic fillers, emulsifiers, surface active stabilisers, pigments, dyes, UV light stabilisers, flow modifiers, antioxidants, fibres or other reinforcing materials, antistatics. plasticisers, moisture scavengers, antifoaming agents, mould release agents, deaeration additives, thixotropics, flow control agents, flame retardants, dispersants, biocides, fungicides, corrosion inhibitors, wetting and dispersing agents, dyes or other visibility enhancing additives and mixtures thereof. These additives may be present, for example, in an amount of from 0.1 to 40% by weight relative to the formulation.

Thus, by means of the present invention, a soft elastic foam with viscoelastic properties is obtainable by reaction injection moulding, casting or as a slabstock foam with a formulation as defined above.

A further embodiment of the present invention is to use a moulding part as defined above as sound insulation, in particular as an encapsulation of an electric motor of a motor vehicle. Such foams also find application in the encapsulation of compressors.

DESIGN EXAMPLE

Motor Capsule:

An acoustically effective motor capsule for electric motors, e.g. in Tesla, Model S, is known, consisting of PUR flexible foam and heavy foil. To achieve the required effectiveness of the spring-mass structure, a high weight per unit area of the heavy foil is necessary. Especially due to the loss factor of the hydride formulation, which can be set very high in comparison, a significant improvement of the acoustic effect is achieved. At the same time, weight can be saved on the part of the heavy foil, which is an important requirement not only for electric vehicles. The CNSL-based polyester diol and its ring structure increase the temperature stability and improve the safety-relevant burning behaviour.

High variation range of the adjustable material properties, wherein primarily the selected polyester diol Cardolite® NX-9203 is used for modelling the viscoelastic behaviour.

| | Adjustable foam properties | visco-modified | high viscoelastic |
| --- | --- | --- | --- |
| Density | 45 to 120 kg/m$^3$ | 45 to 75 | 70 to 110 |
| Storage modulus | 40 to 600 kN/m$^2$ | 60 to 90 | 100 to 600 |
| loss factor | 0.1 to 0.8 | 0.1 to 0.26 | 0.4 to 0.6 |

Weight reduction with regard to the entire component concept, CC reduction through weight saving and (proportionate) use of renewable raw materials, compact insulation, improved combustion behaviour enables reduction/elimination of additional flame retardants.

The formulations according to the invention met the current requirements of the automobile manufacturers, in particular with regard to the hydrolysis resistance according to DIN EN ISO 2440 of a component in the exterior, even at a continuous temperature of 100° C. and a short-term temperature of 120° C. In deviation from DIN EN ISO 2440, 3 cycles a 15 h at 120° C. were measured.

The invention claimed is:

1. A polyurethane foam formulation for the production of soft resilient PUR moulded foams having viscoelastic properties comprising :
   (a) a novolac polyol having a hydroxyl functionality of 3, and a hydroxyl value in the range of 160 to 240 mgKOH/g,
   (b) a polyether polyol having a hydroxyl functionality of 3, and a hydroxyl value in the range of 20 to 40 mgKOH/g,
   (c) a block copolymer having a hydroxyl value in the range of 25 to 45 mgKOH/g, and
   (d) a combination of catalytically active additives as well as stabilizing additives.

2. The polyurethane foam formulation according to claim 1, wherein the proportion of component (a) is 5 to 35% by weight, based on the polyurethane foam formulation.

3. The polyurethane foam formulation according to claim 1, wherein the proportion of component (b) is 30 to 65% by weight, based on the polyurethane foam formulation.

4. The polyurethane foam formulation according to claim 1, wherein the proportion of component (c) is 5 to 15% by weight, based on the polyurethane foam formulation.

5. The polyurethane foam formulation according to claim 1, wherein the novolac polyol of component (a) is based on a phenol and formaldehyde polymer and is tipped with ethylene oxide and/or propylene oxide.

6. The polyurethane foam formulation according to claim 1, wherein the polyether polyol of component (b) is derived from glycerol.

7. The polyurethane foam formulation according to claim 1, wherein the catalytically active additives comprise at least one reactive hydrogen azide group.

8. A process for the production of soft-elastic moulded foams having viscoelastic properties, said process comprising providing a mixture of
   A) a polyisocyanate,
   B) a polyurethane foam formulation according to claim 1,
   C) water, and
   D) one or more catalysts, and
   reacting components A)-D).

9. The process according to claim 8, wherein component A) comprises diphenylmethane diisocyanate (MDI) that is provided at an MDI index in a range from 50 to 100.

10. A soft elastic foam having viscoelastic properties obtainable by reaction injection moulding, casting, or slabstock foaming the polyurethane foam formulation according to claim 1.

11. The soft elastic foam according to claim 10, wherein the soft elastic foam is formed as sound insulation.

12. The process according to claim 9, wherein the MDI is provided at an MDI index in the range of 65 to 85.

* * * * *